Jan. 6, 1942.  D. C. WILKERSON  2,268,916
MAIN CLUTCH CONTROL
Filed Oct. 7, 1932  3 Sheets-Sheet 3

Inventor
Daniel C. Wilkerson
By Blackmore, Spencer & Hair
Attorneys

Patented Jan. 6, 1942

2,268,916

UNITED STATES PATENT OFFICE 2,268,916

MAIN CLUTCH CONTROL

Daniel C. Wilkerson, Detroit, Mich., assignor to General Motors Corporation, Detroit, Mich., a corporation of Delaware Application October 7, 1932, Serial No. 636,718

52 Claims. (Cl. 192—.01)

This invention relates to power transmission for motor vehicles.

An object of the invention is to provide means to release the clutch by the action of the gear shift lever as well as to effect a controlled precision reengagement of the clutch by the depression of the accelerator pedal.

The invention also contemplates the provision of simple means for cutting out the operation of the automatic clutch release mechanism whereby the car control may be in all respects conventional.

The invention has for another object an arrangement whereby "free wheeling" may be had if desired by the manipulation of the gear shift lever to such an extent as to release the power-operated main clutch but without the employment of overrunning clutches or complicated operating parts and without actual shifting of the transmission gearing to neutral position.

As another object the invention aims to provide lost motion within the members of the gear selecting mechanism, the taking up of which releases the main clutch, the clutch being held out of engagement when the gear shifter is moved to any of the gear ratio positions, and only becomes reengaged by the action of the throttle operating mechanism, or the emergency action of the clutch pedal.

A further object of the invention is to protect gear ratio synchronizing devices within the transmission, by providing interconnecting controls such that the torque on the driving members of the clutch and transmission will always be relieved prior to the engaging action of these synchronizing devices, by the rapid opening of the main clutch upon the first motion of the gear ratio selecting means from any gear position.

Another object of the invention is to provide a further protection for the said synchronizing devices by mechanically linking the controls of the main clutch with the gear ratio selector so that incomplete motion of the latter toward a gear-engaged position will prevent galling of the synchronizing devices by a relieving of the clutch engaging action.

Simplicity in structure and operation are among the other objects to be attained.

In the drawings illustrating the invention.

Referring by reference characters to the drawings, the engine of a motor vehicle is represented by numeral 7. At 9 is shown the clutch housing and at 11 is the housing for a transmission, the latter preferably being of the synchronized type, having sequentially operating friction and positive clutches in gear ratio engagement.

The engine has an intake manifold 13 which is to serve as a source of suction for a power unit. The manifold communicates with the carburetor 15 by means of a header 17. Between the carburetor and manifold is shown a throttle controlling lever 19. Beneath the floorboard 21 of the car is a pivoted lever 23. A rod 25 connects lever 23 with the throttle lever 19. A throttle operating lever in the form of a pedal 27 is pivoted at 29 to the floorboard 21. The accelerator pedal 27 is connected to the lever 23 by a link 31. By this means depression of the pedal 27 opens the throttle. A spring 33 is suitably anchored and connected to lever 23 and is operable to restore the pedal 27 to its uppermost position wherein the throttle is in its idling position.

On shaft 35 there is rotatably mounted a clutch releasing pedal 37. It is normally held in retracted position by a spring 39. Also rotatably mounted on shaft 35 is a clutch releasing lever 41. The clutch pedal functions indirectly to release the clutch by rotating lever 41. It so operates by the provision of a lug 43 on an arm of the clutch pedal 37 which lug engages an arm 45 of lever 41. The counter-clockwise rotation of lever 41 is operable to release the clutch. From the arm 47 of lever 41 a rod 49 extends to and engages the end of a throw-out lever 51. A spring 53 resists the rotation of lever 41 and restores the throw-out lever 51 after clutch release. Lever 51 is forked as shown at 55 in Fig. 2 to engage a collar 57. Collar 57 moves to the left (Fig. 2) in clutch releasing movement. Through the instrumentality of bearing 59 the collar rocks fingers 61 about their fulcra 63, which fulcra are carried by a plate 65 which is rigidly secured to the flywheel 67 by fastening means 69. The flywheel is secured as usual by fastening means 71 to the flange of crankshaft 73. A pressure plate 75 is located within the flywheel enclosure beneath plate 65. It has arms 77 projecting through the plate 65, which arms carry pins 79. The fingers 61 have openings 81 through which the pins pass, and springs 83 are used to prevent rattling of the fingers. Between the pressure plate 75 and the face of the flywheel is a driven clutch disc 85 which is provided with facings 87. Normally the springs 80 mounted in cups 82 held by plate 65 engage the pressure plate 75 and hold the driven plate between the plate 75 and the face of the flywheel. The driven plate is fastened to a hub 89 which is splined to the clutch driven shaft 91, the latter preferably piloted into an opening in the crankshaft as shown.

Preferably the clutch housing 9 has an inwardly directed sleeve 93 for the passage of the driven shaft. Supported on the sleeve 93 and on the hub 89 is an elongated sleeve 95 having an end flange 97. A bushing 99 surrounds sleeve 95 and is located within the collar 57. Surrounding and secured to the sleeve 95 between the hub 89 and the bearing 59 is a spring supporting sleeve 101. Surrounding the latter and midway between its ends is a ring 103 to the opposite sides of which are secured oppositely wound springs 105 and 107. Spring 105 presses firmly against the driven clutch hub, or more exactly against a ring 109 secured thereto, and spring 107 similarly engages the adjacent race of bearing 59. The assembly 103—105—107 operates as a warpable unit. A guide rod 111 secured to the housing 9 extends through the collar 57 and prevents its rotation. It will be seen that the rotation of the driven hub is the same as that of the driven shaft and that the rotation of the forward ball race is the same as that of the engine or driving shaft due to the engagement with the ball race of the fingers 61 which are non-rotatably associated with the pressure plate, which latter is non-rotatably mounted within the flywheel. The windings of springs 105 and 107 are such that when the engine shaft is overrunning the driven shaft (both turning in the same direction) spring 107 tends to wind up (reduce its diameter) and thereby clamp sleeve 95. Spring 105 tends to unwind (increase its diameter) and separate from sleeve 95. While both springs tend to rotate the ring 103 greater speed of the driving shaft causes a rotation to be imparted to the ring 103 by the spring 105 greater than is being given it by spring 107 with the result that spring 107 is wound firmly upon the sleeve 95. This causes the rotation of sleeve 95. The function of the device thus described to effect the rotation of sleeve 95 will be explained below. In a similar way excessive speed of the driven shaft also rotates sleeve 95.

There is employed a vacuum power operating device for releasing the clutch against the action of its clutch closing springs 80. This device makes use of a vacuum power cylinder 113 having a diaphragm 115 to which is connected a stem or piston rod 117. The latter is connected by a cable 119 to the end of arm 45 of the above described lever 41. The region within the power cylinder to the right of the diaphragm is at all times open to atmosphere through vents 254. A valve box 121 of cylindrical form has a chamber 123 communicating with the vacuum chamber of the power cylinder by an opening 125. A conduit 127 connects the chamber 123 with the intake manifold of the engine. Adjacent the junction of the conduit 127 with the manifold 13 is a valve 129 having an aperture such that it may vent the power cylinder through the chamber 123 and the conduit 127 when in the position shown. If the valve is rotated for a quarter turn the vent opening 131 is closed and a passage is opened from the manifold to the power cylinder.

Figure 1:
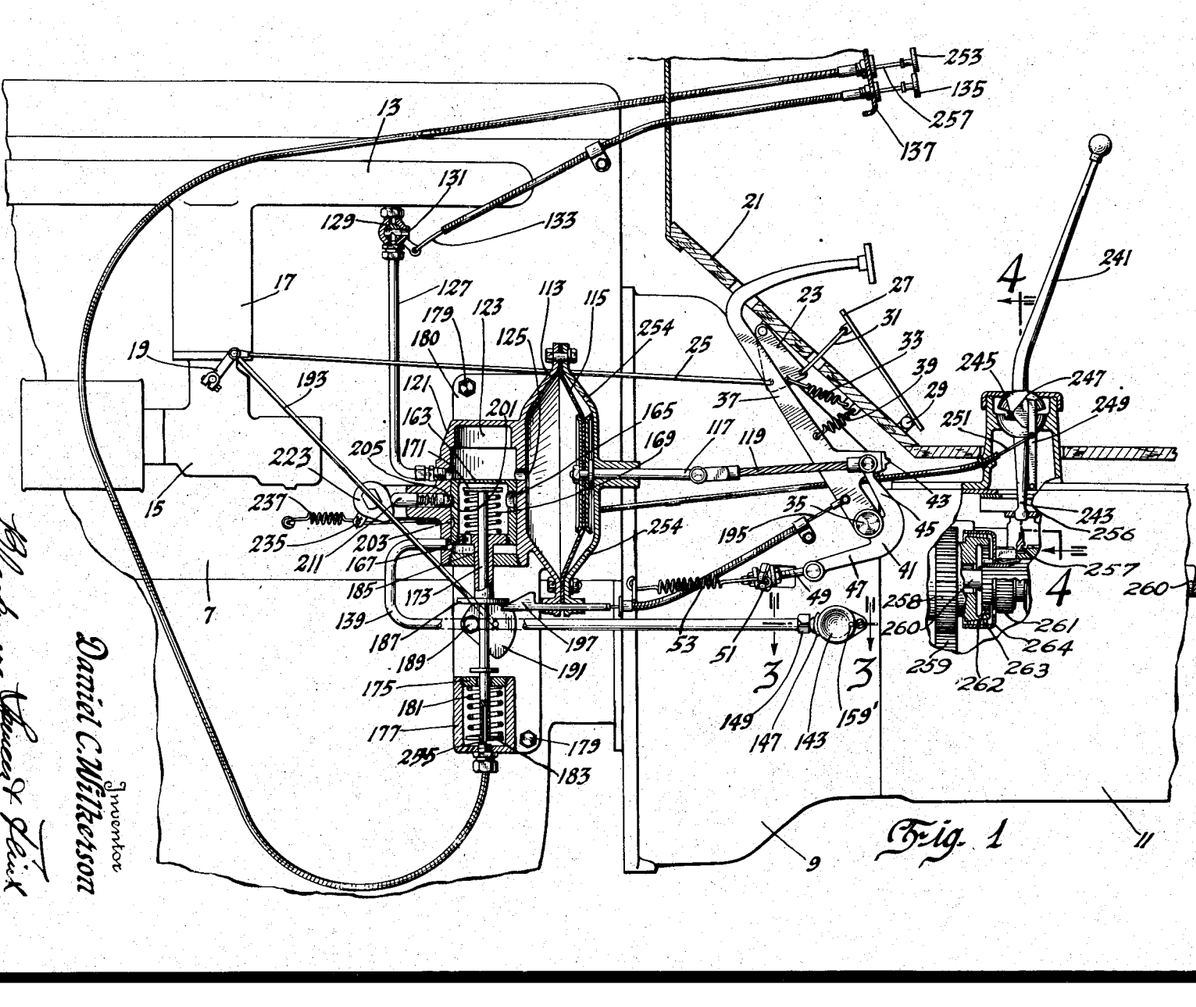
Fig. 1 is a side elevation of the engine and transmission of a motor vehicle showing the novel mechanism partly in section.

The valve 129 may be operated by a button or the like 135 connected to the valve by a Bowden wire 133. It will be obvious that when the valve is as shown in Fig. 1 the power cylinder is vented and the clutch is free to be engaged by its springs 80. With the button so positioned there is obviously no clutch operation by power and the car must be manipulated as usual, depression of the pedal 37 being relied on to release the clutch.

From the bottom of the valve box 121 a pipe 139 functions for a vent for the power cylinder in the use of the automatic clutch device. Suitably secured to the wall of the clutch housing as at 141 is a cylinder 143 having registering openings 145 and 145'. Registered with these openings is an opening in a fitting 147 which is secured as by welding or otherwise to the wall of the cylinder. The end of pipe 139 is clamped by a nut 149 to the fitting 147. Within the cylinder 143 is a piston 151 having a through passage 153. The piston is biased by a spring 155 to a position in which the opening 153 registers with the openings 145 and 145'. The spring is made adjustable by a threaded abutment 157 and openings 159 and 159' are provided to maintain atmospheric pressure in both ends of the cylinder 143. A flexible connecting element 161, having adjustable length means 161', extends from the flange 97 to the piston 151 whereby the piston may be pulled upwardly against the tension of spring 155 to variably close the passage through opening 153.

Again returning to a consideration of cylinder 121 shown on Fig. 1 it will be observed that it contains a hollow piston 163. This piston has an opening 165 which is intended to at times register with the opening 125 of the power cylinder. It also has an opening 167 in communication with the lower closed end of the cylinder 121 and with the pipe 139.

Within and engaging the bottom wall of piston 163 is a spring 169, the upper end of which is engaged by a disc 171 carried by a stem 173. The stem extends through the upper end 175 of another cylinder 177. This cylinder 177 may be an integral part of a casting 180 secured to the engine housing by fastening means 179. As shown in the drawings, the valve box or cylinder 121 and the body of the vacuum power cylinder 113 are also formed as parts of this same member 180.

A spring 181 within the cylinder 177 engages the head 175 of this cylinder and also a disc 183 carried by the aforesaid stem 173. The lower wall of the piston 163 has a tubular stem 185 surrounding the stem 173 and extending through the bottom wall of the said cylinder 121. At the end of this tubular stem or piston rod 185 is a disc 187. Pivoted to the member 189 is a cam 191. A lost motion link 193 connects the throttle lever 19 with this cam. As a result of this construction, when the accelerator pedal is depressed a pull is imparted through rod 193 which rocks the cam 191 and lifts the hollow piston 163. The longer extension of cam 191 permits unrestricted throttle operation after such actuation without affecting the setting of piston 163 thereafter.

This piston may also be raised by a depression of the clutch pedal 37 by means of a Bowden wire 195 which projects a wedge 197 under the disc 187 thereby lifting it. It should be explained that the spring 181 is relatively stiff and tends to normally hold the piston 163 as shown in Fig. 1 whereby the power cylinder is operative to release the clutch. To drive the car when the vacuum servo motor is operative, the power cylinder must be vented through openings 125, 165, 167, and pipe line 139. This requires mechanism to raise the piston 163 to its upper position in which the spring 181 is under tension. When the accelerator is depressed cam 191 performs this function. It is also performed by the manual depression of pedal 37 acting through the movement of wedge 197.

Means are provided to relieve the operating mechanism of this load as when the clutch is engaged by the venting of the power cylinder. Within the wall of piston 163 are recesses 201 and 203 into the one or the other of which may be projected a ball 205 (Fig. 5) by a push rod 207 having a stem 207'. This member 207 is slidably mounted in a boss 209 of the cylinder 121. Also slidable in this boss is a plunger 211. The plunger 211 receives the stem 207' and guides the latter. Between the push rod 207 and the plunger 211 is a spring 213. When the plunger 211 is forcibly pushed into the boss 209 the ball 205 is resiliently held by the spring 213 in recess 201 or in recess 203 so that the piston 163 is held in position. It may be held in clutch releasing position as shown in Fig. 1, or it may be held in clutch engaging position in which latter case the ball 205 engages in the lower recess 203, this latter position corresponding to power cylinder venting and clutch engagement. In this latter case it will be understood that the spring 181 is under tension and ready to pull down the piston 163 and open the suction line and release the clutch whenever the pressure on 211 is relieved. The means to apply and release the pressure on 211 will be described below. In the act of raising the piston 163 by means of the cam 191 or the wedge 197, the upper spring 169, which is of somewhat less strength than spring 181 is first compressed. In consequence a quick release is assured when the locking detent operable through plunger 211 is released.

Figure 8:
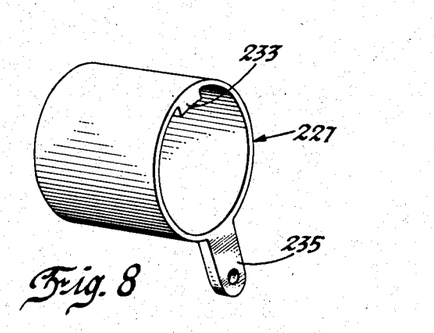
Figure 9:
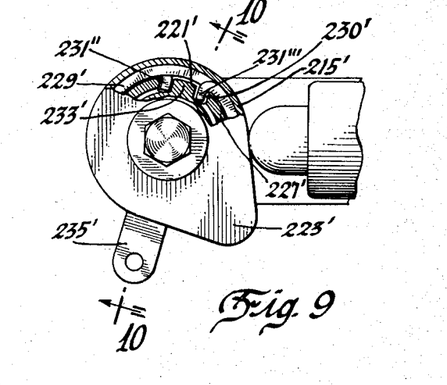
Fig. 9 is a sectional view of a modification of Figs. 5 and 6.
Figure 10:
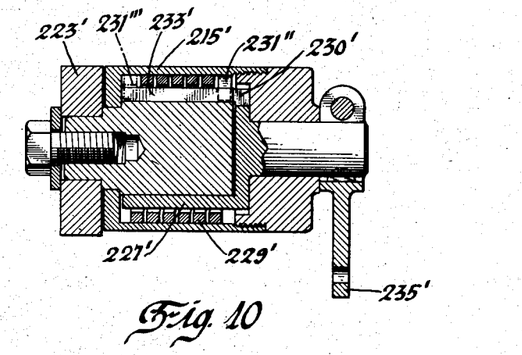
Fig. 10 is a vertical section of the modification of the view corresponding to Fig. 6.
Figure 11:
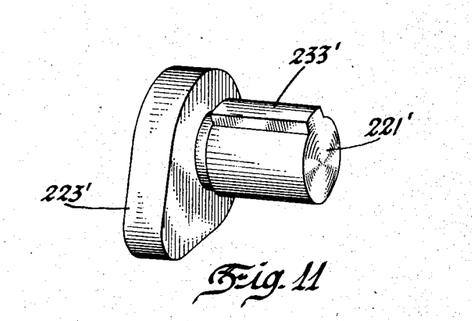
Figs. 11 and 12 represent an exploded view of two parts of the modification.
Figure 12:
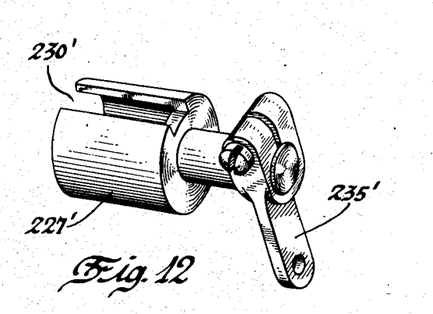

A cylindrical block 215 (see Fig. 6) is suitably secured by fastening means (not shown) to any convenient adjacent fixture. This fixture may conveniently be a projection of part 180. Rotatably mounted at one end of block 215 is a slotted collar 221. Rotatable with respect to the collar 221 and embracing it, is sleeve 227 and lever 235 retained in position by fastening means 225. A sleeve 227 is rotatably supported on the slotted collar 221 and fixed to the lever 235. The sleeve 227 is provided with a long lug 233 as best shown in Fig. 8. A helical spring 229 snugly embraces the block 215 within the sleeve 221. It has ends 231 and 231' extending radially through the slot 230. These ends 231 and 231' occupy positions spaced apart less than the arcuate dimensions of the slot 230. Axially extended between the spring ends is a lug 233 extending from the lever 235 and attached to the sleeve 227. The slotted collar 221 is provided with a lever arm or cam 223. A weak spring 237 is suitably anchored and attached to the lever 235. When the lever arm 235 is rocked against the action of spring 237 it moves one end of the spring 229 and unwinds it and thereby overcomes the friction in the spring upon the block. Further motion of the lever 235 and the lug 233 causes the said end of the spring to engage the end of slot 230 and rotate the collar 221 with the lever 235. The continued rotation causes the cam 223 to depress the plunger 211 into the boss 209 and force the ball 205 into one or the other of the recesses of the piston 163. The tendency of the lever 235 to reversely rotate under the influence of springs 213 and 237 and relieve the locking pressure of plunger 211 is resisted, because at the beginning of such motion the spring again grips the block 215 and one of its ends engages the end of slot 230 and thereby prevents the rotation of the cam 223.

The means for moving the arm 235 consists of a connection between this arm and the gear shift lever. The shift lever comprises two parts, an upper manually operable part 241 and a lower actuated part 243, there being a limited lost motion therebetween. The lower part is formed with the ball of the ball and socket joint, and between the upper and lower parts is a centering spring 245 which tends to maintain alinement between the axes of the upper and lower parts. The upper part carries a two-arm cam 247 having upper and lower ends either of which ends is operable to rock clockwise a lever 249 when the lever 241 is rocked from the position shown in Fig. 1 for example. When so rocked it pulls the cable of a Bowden wire, the ends of which are connected to the lever 249 and to the lever arm 235. The lower part of the gearshift lever 243 has a swell fitted loosely into a recess cut in the upper portion of a member 256, which is operatively attached to the shifter fork 257.

Figures 2, 3, 4, 5, 6:
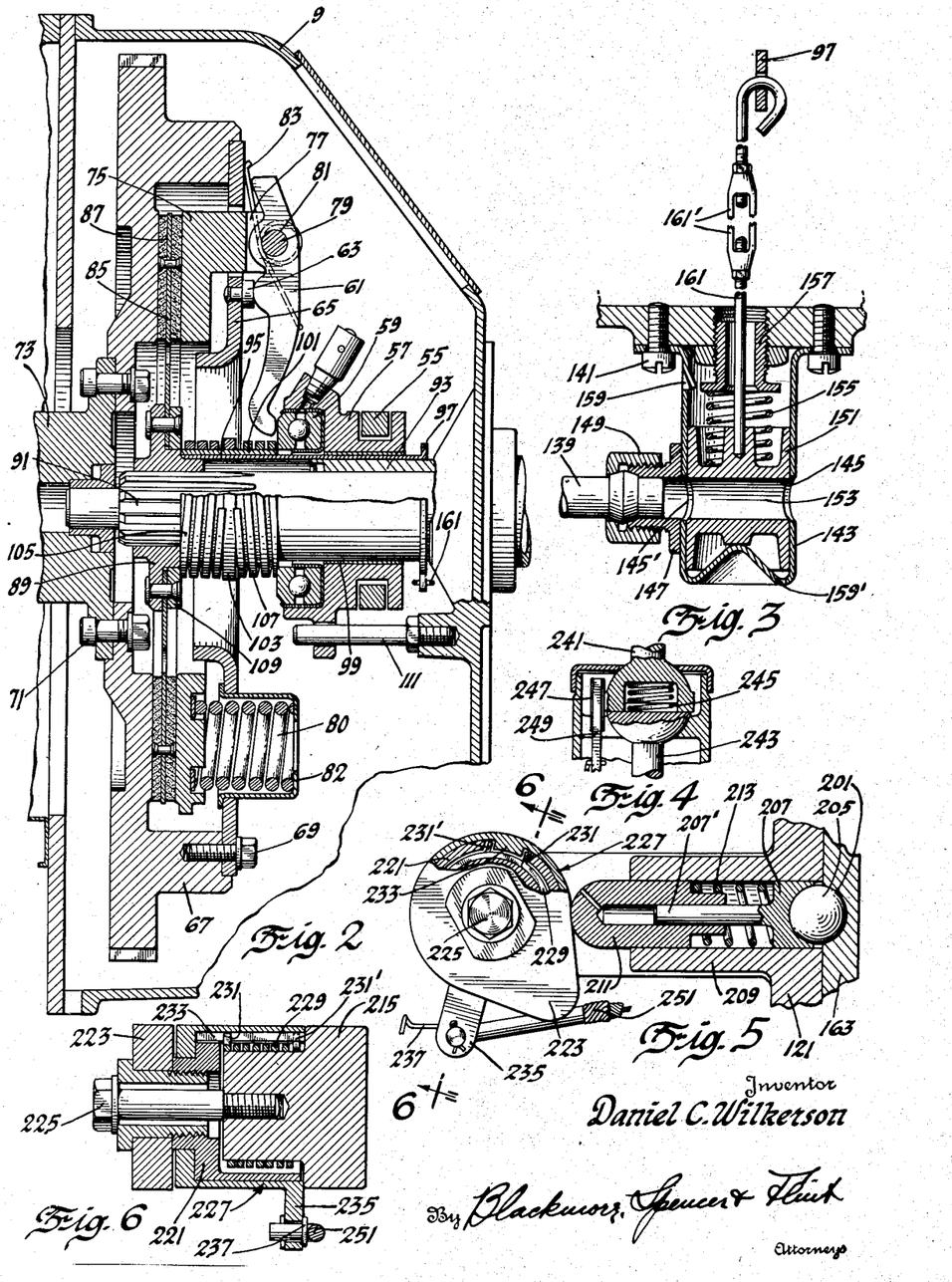
Fig. 2 is a vertical section through the clutch.
Fig. 3 is a section on line 3—3 of Fig. 1.
Fig. 4 is a section on line 4—4 of Fig. 1.
Fig. 5 is a view partly in section and partly in elevation of a detent associated with the control mechanism.
Fig. 6 is a section on line 6—6 of Fig. 5.
Figure 7:
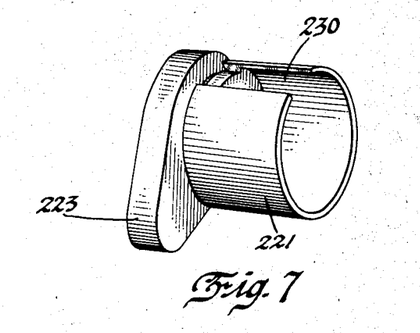
Figs. 7 and 8 represent an exploded view of two of the parts of Fig. 6.

Gear 258 is keyed in the customary manner to an extension of the main clutch shaft 91 shown in Fig. 2, and is in constant mesh with gear 259, a portion of which is shown in Fig. 1. Gear 259 is the driver for the countershaft gears which are selectively meshed for different speed ratios by movement of lever 243.

Shaft 260 is the output or load shaft of the gear transmission, and is joined to the final drive through the customary universal joints and shafting, (not shown). The left end of this shaft 260 is shown piloted adjacent to gear 258, and is splined to receive gearbody 261, which is axially slidable by motion of the fork 257.

The extending portion of gear 258 has an internally toothed clutch 262, which is meshable with the extending portion of gearbody 261.

The extension of gear 258 affords a co-axial friction surface 263, which is engaged by synchronizer cone 264, the latter being mounted upon and axially movable with gearbody 261.

The operation of this gear shifting arrangement is functionally the same as in conventional synchronizing gear transmissions.

Preferably a dash operated member 253 is connected by a Bowden wire 255 to an extension 257 from the rod 173 whereby a positive force may be had to pull or push rod 173 which operates to move the piston 163 and to thereby open the clutch by vacuum or relieve same. Sleeve 95, rod 161 and valve 151 constitute a recording device capable of enforcing the clutching action as determined by the assembly 103—105—107 and the speed difference conditions of shafts 73 and 91.

The operation is substantially as follows:

As long as the button 135 is positioned as shown on Fig. 1 the vacuum for clutch operation is not available. There is no communication between the manifold 13 and the chamber 123. Chamber 123 is vented to the atmosphere through opening 131. Under these circumstances the operation of the car is strictly conventional.

If it be desired to render available the vacuum clutch operating mechanism, the button 135 is pushed in to open communication between the manifold 13 and the chamber 123, the vent opening 131 being closed. When now the piston 163 is in its upper position it serves to close the communication between pipe 127 and chamber 123. In that position it also serves to open communication between the power cylinder and the outer atmosphere through opening 125, openings 165 and 167 in the piston 163, and the air pipe 139. Spring 181 biases the piston to its lower—clutch released—position. Plunger 211, when pressed inwardly by the cam arm 223, presses the ball 205 toward the wall of the piston 163 and may enter one of the two recesses 201 or 203 in the piston wall. This resilient pressure force is to hold the piston 163 in either of its two positions.

For the purpose of further explaining the operation of the device let it be assumed that from the position shown by Fig. 1 the button 135 is pushed inwardly to render the vacuum device operable; that the spring 181 is holding the piston valve 163 inwardly as shown; that the accelerator pedal is released; that the gear shift lever is in neutral; and that the engine is running. Since suction is holding the clutch released, the operator may shift the lever 241 at will. The first motion of the lever 241 takes up the lost motion relative to lever 243. In so doing it pulls the Bowden wire 251 and rocks the lever 235, and with it the cam 223 as explained above to push inwardly on plunger 211. The ball 205 is thus held firmly in the upper recess and under the pressure of spring 213 serves to resist reciprocation of the piston 163. Further movement of the lever 241 moves the lever 243 and makes it shift, for example, to low speed. During this movement the clutch remains disengaged and additional pressure is imparted to plunger 211 by the cam lever 223. It may be explained at this point that after the lever 243 assumes the angular position, as for low speed, and when the hand pressure on lever 241 is removed, the spring 245 restores the upper lever member 241 into alignment with the lower lever element 243. This action only partially restores the cam 247 toward the position shown in Fig. 1. The partial return movement is still operative to hold the lever 249 in a position to retain the detent device 205 in operative position. The accelerator pedal 27 is then depressed, speeding up the engine and rotating the cam 191. This rotation of the cam 191 lifts the disc 187 and the piston 163 against the friction between the piston wall and the ball 205. When the opening 165 in the piston registers with the opening 125 in the power cylinder, the ball 205 enters the lower recess 203 whereby the detent holds the piston 163 in its upper position with spring 181 under tension. Air may then enter through pipe 139 and destroy the vacuum in the power cylinder, whereupon the clutch springs 80 push the pressure plate toward the flywheel and engage the driven plate between the flywheel face and the pressure plate as usual. Any inequality in the rate of rotation in the driving and driven plates operates at once through the instrumentality of sleeve 95 which moves piston 151 to choke the air passage through opening 153 (see Fig. 3) and thereby serves to delay the venting of the power cylinder. When the two parts of the clutch have a synchronized rate of rotation, the venting is complete and the clutch fully engaged.

Attention is directed to the peculiar operation of bleed valve 151 which controls the admission of air to the vacuum chamber of power cylinder 153. Since engine shaft 73 and clutch driven shaft 91 turn always in the same direction; that is, counterclockwise in the motor car of today, whatever drag is imparted to sleeve 95 and flange 97, caused by asynchronous speeds of the shafts, is in the same hand of rotation; therefore links 161—161' to valve 151 are extended by rotational effort of flange 97 so as to cause valve 153 to move from the position of Fig. 3. Such tensioning force compresses spring 155 as the movement takes place, and the air aperture between port 145 and valve 153 decreases in magnitude proportional to the asynchronous indicator action of sleeve 95 as resisted by adjustable spring 155. Extremely high differences in speed between the input and output shafts of the clutch may cause ports 145 to be blocked entirely by valve 151, whereupon the main clutch plates will drift together very slowly as air leakage past the seats of valve 151 in cylinder 143 takes place. This type of action serves as a safeguard against abuse of the mechanism. When the disproportion in shaft speeds begins to diminish, the valve 151 moves to uncover port 145 once more, eventually opening the bleed line 139 fully to atmosphere as synchronism is achieved.

The car is then driven by the further depression of the accelerator pedal up to a speed where a change to a higher driving ratio is desired. It is no longer necessary, as heretofore, to depress the clutch pedal prior to shifting the shift lever. The accelerator pedal is released, thereby rotating cam 191 so that the power cylinder may be opened to suction where the pressure on the detent device is relieved to permit spring 181 to withdraw the piston 163. The first movement of lever 241 takes up the lost motion relative to lever 243, thereby rotating cam 247 sufficiently to let the lever 249 lie flat against it, thereby relieving the pressure on the detent device. If the shift lever is held in this position the clutch is released by the action of spring 181 upon valve 163 while the gears are still engaged. If held in this way the car will be in a free wheeling condition. To shift into second speed, the lever may be further manipulated to engage the proper clutch or gear in the transmission, this operation locking the detent as before. Depression of the accelerator pedal operates to push up the piston 163 and vent the power cylinder whereby the clutch engages. The same sequence of operating steps is available for other shifting movements.

With the car engine stopped, there being no vacuum available, the main clutch plates are normally held together by springs 80. When the engine is started, vacuum is built up and since spring 181 is active, vacuum valve is positioned so as to open the main clutch immediately.

In a car stopped condition, the prior movement of the gear lever from a gear position to neutral has rocked cam 223 to a position such that stress on poppet mechanism 235—205 is relieved, allowing spring 181 to pull the vacuum valve into such a position that the clutch motor 254—115 is actuated and the clutch is opened.

Now the movement of the gear lever from neutral toward a gear setting rotates the high spot of cam 223 to such a position that poppet mechanism 235—205 is loaded, and tends to hold valve in either open or closed position by virtue of notches 201—203. This preloading of the poppet determines that upon the next movement of the accelerator pedal, which rocks plate 191, the spring of poppet 205 will be momentarily overcome, but valve will now be in the closed position, and poppet will be active to hold the valve closed against the opening action of spring 181, so long as gear lever is retained in a gear engaged position.

Initial movement of the gear lever away from a gear engaged position rotates cam 223 so as to relieve the stress on the poppet, so as to permit spring 181 to move the vacuum valve to clutch release position before shifter fork 243 is moved far enough to exert a de-meshing of a gear or clutch. Lost motion between 241 and 243 permits such clutch releasing movement.

After this occurs, there is no drive through the gears or through the main clutch. Subsequent movement of the gear lever toward a gear driving position rocks either end of cam 247 so as to position cam 223 anew for loading the poppet.

When the car is in motion with the engine driving, and the main clutch engaged, the vacuum valve 163 is held in the position to admit air to the diaphragm chamber, by poppet 205. Now at any time the car driver may "freewheel" by moving the gear lever from the existing gear position only sufficiently to unload the poppet, whereupon the spring 181 will pull the vacuum valve to the clutch disengaged position. The gears or clutches in the transmission have not been demeshed, but the main clutch elements are now separated. Subsequent depression of either clutch or accelerator pedal will thrust valve 163 into bleed position whereupon the synchronizer spring 107 and valve 151 will regulate the rate of clutch re-engagement.

Thus it will be seen that the car driver may coast in any gear by moving the gear lever toward neutral far enough to unload the poppet 205, and can re-synchronize and engage the clutch at will by simple movement of the accelerator or clutch pedals.

In order to effect clutch movement quickly at any time by direct mechanical operation, use may be had of the dash button 253 connecting with the extension of rod 173.

The association of this shift mechanism with a synchronized type of transmission is a peculiar feature of this invention. When the lever 241 is shifted it first overcomes the lost motion and then moves the lever 243. As the positive clutch engagement under the influence of movement of lever 243 is delayed by the synchronizing clutch, the resistance of spring 245 is felt by the operator up to the time that the jaw clutch engages. In operating the shift lever to make a shift the operator moves the lever 241, feels the resistance of spring 245 to that position wherein the friction clutch further resists the lever movement. Thereafter when synchronism occurs the jaw teeth engage as a result of a movement of lever 243 relative to lever 241 under the influence of the pressure of spring 245. The operator notices the relief from his manual effort in holding spring 245 under compression when the jaw teeth engage.

One very important feature of this invention is the simplicity of the operating mechanism. The operator uses an accelerator pedal and a shift lever in the usual way. He is freed from the use of the clutch pedal in shifting gears, the retention of that pedal being for use in starting before engine suction is available and for emergency purposes. At other times the conventional and easy movements of the shift lever perform all necessary operations and, in addition, and if desired, the car can be driven in free wheeling by merely partially moving the shift lever with the accelerator pedal relaxed. The button 135 is to be used when it is desired to change from the automatic control to standard or conventional control. The only difference in the two types of control is that in the latter the pedal 37 must be used in the customary manner.

In some prior constructions employing automatic vacuum release of the clutch the release is effected by and simultaneously with the release of the accelerator pedal. In consequence the car always coasts out of control when approaching a traffic stop light from the moment when the accelerator pedal is released. With this construction such action does not occur unless the operator wishes it and takes a definite step to accomplish it. In accordance with the present invention, as a car approaches a stop signal, removal of the pressure on the accelerator pedal does not release the clutch and retardation of the car under the influence of the engine acting as a brake occurs. If the traffic light changes before the car speed is appreciably checked the operator need only depress the accelerator pedal to drive on. If he is forced to stop, a slight movement of lever 241 serves to release the clutch. In this way he is enabled to free wheel. He may complete the movement of gear shifting at once if he desires, since the clutch was released by the first movement of the lever 241 and the piston 163 continues to be held in clutch releasing position by the detent and is so held until the accelerator pedal again operates to lift the piston 163 and vent the power cylinder.

The mechanical control for the main clutch actuating mechanism is a particular part of my invention. An alternative structure to that shown in Figures 5, 6, 7, and 8 is given in Figs. 9, 10, 11, and 12, wherein the gripping element, a helical spring, is of the expanding instead of the contracting type. In these figures the fixed element 215' is a drum or shell, the control member 235' is attached to the slotted hollow piece 227', and the cam 223' of the positioned element 221' carries a key or lug 233'. The helical spring member 229' has two ends 231'' and 231''' which are turned inwards in the slot 230', and it is stressed so as to be initially expanded against the fixed shell 215'. Motion of the control member 235' relieves the locking tension of the helical spring, when moved in either direction. This motion is transmitted to the lug 233' which is rigidly attached to the positioned element 221'. Resistance of the cam 223' or the positioned element 221' to which it is fixed cannot prevent the control member 235' from setting the cam in a predetermined position, after which any reaction force on the cam tending to rotate it is prevented by the helical spring locking the assembly to the fixed drum 215'. It will be seen that this mechanism is irreversible.

I claim:

1. In combination, an engine, a clutch, a change speed transmission having a ratio changing means, power means to release the clutch, means operated by the first part of the movement of the ratio changing means from a driving position to render the power means operable to release the clutch, and additional means manually operable upon the said power means to permit said clutch to engage.

2. In combination, an engine, a clutch, a change speed transmission having a ratio changing means, power means to release the clutch control mechanism for said power means, yieldably operable means to bias the control mechanism to clutch releasing position, means operated by the ratio changing means in moving from one driving ratio position toward another to render the yielding means operative prior to the attainment of another driving ratio position and additional manually operated means effective to operate said control mechanism whereby said clutch is engaged.

3. The invention defined by claim 2, together with a throttle controlling member and mechanism operated thereby in throttle opening movement to overcome said yielding means and render inoperative said power means.

4. The invention defined by claim 2, said ratio changing means including a detent operable to hold the yieldably operated means in positions of adjustment.

5. In combination, an engine having a throttle control member, a clutch, a change speed transmission having a ratio changing means, vacuum operated means to release the clutch, said means including a power cylinder and a movable valve, yieldably operated means to bias said valve to a position wherein the power cylinder is operable to release the clutch, detent means operable to hold said valve in its positions of clutch engagement or release, mechanism operated by the ratio changing means to control said detent means, means operable in response to throttle opening movement of the throttle controlling member to move the yieldably operated means against the yielding force imparted thereto and against the action of the detent means into clutch engaging position.

6. In combination, an engine having a throttle controlling member, a clutch, a change speed transmission having a ratio changing means, a power unit to release the clutch, means dependent upon actuation of the throttle controlling member to render the power unit inoperative to release the clutch, and additional yielding means normally operable to render the power unit active, and detent means operated by the ratio changing means to prevent the action of the yielding means whereby the power unit may be held in clutch-engaging position.

7. The invention defined by claim 6 together with means responsive to relative rotary movements of the driving and driven members of the clutch tending to delay the full action of clutch reengagement until the driving and driven members rotate at approximate synchronism.

8. In combination, an engine having a source of suction, a throttle valve operating member retracting means therefor, a clutch, change speed mechanism having speed ratio changing controls, power mechanism operated by suction from said source to release the clutch, a valve device to control said power mechanism operable in a first position to open communication between the source of suction and the power mechanism and in a second position operable to vent the power mechanism, yieldable means independent of said first named means operative to move said valve to its first position, a connection whereby the throttle valve operating member may overcome said yielding means and move said valve to its second position and a connection between said speed ratio controls and said device whereby normal shifting movement of said controls influences the action of said valve mechanism.

9. The invention defined by claim 8 together with a detent device operable to hold said valve in its positions of adjustment.

10. The invention defined by claim 8 together with a detent device operable to hold said valve in its positions of adjustment, and a connection between said detent device and said ratio changing means whereby the said means controls the detent.

11. In combination, an engine, a clutch, vacuum operated means to release the clutch, a valve movable to a first position to render said vacuum operated means operative to release the clutch, and to a second position to vent the vacuum operated means, said venting including a second valve and speed responsive mechanism directly acting in the same direction of rotation as the clutch to control said second valve in accordance with any asynchronous condition of the clutch.

12. In combination, an engine, a speed control for the engine, a clutch, auxiliary power means for actuating the clutch, a control for said auxiliary power means, a power transmission, a control for said power transmission, connecting means whereby said power transmission control may influence the action of said auxiliary power means and additional connecting means whereby the said speed control for the engine permits or prevents the operation of the auxiliary power clutch actuating means.

13. In combination, an engine and speed control therefor, an auxiliary power operated clutch, and control means therefor, associated means for controlling said clutch by said engine speed control, a power transmission and a ratio selecting means therefor, and means actuated by the normal direct selection movement of said ratio selecting means effective to influence the movement of said clutch thru a lost motion connection.

14. In a power transmission mechanism, a clutch comprising driving and driven elements, means to modify the speed ratio of power transmission, auxiliary power means to actuate the clutch, and controls therefor, speed synchronizing means for at least one of the different speed ratios, connecting means between the auxiliary power control for the clutch and the speed ratio modifying means whereby the latter may cause disengagement of the clutch, means for compelling engagement of the clutch, means permitting said compelling means to act consisting of a device responsive to the difference in speed of the clutch driving and driven elements and means whereby selection movement of the speed ratio modifying means is effective to initiate the action of said auxiliary power means.

15. In a clutch control system, a clutch, auxiliary power operating means for the clutch, controls for said means including means normally energized to cause said auxiliary power operating means to disengage the clutch, means for regulating said auxiliary power operating means to permit engagement of the clutch, and additional means for controlling the rate of engagement of said clutch including mechanism directly acting between and responsive to asynchronous speeds of the clutch members.

16. In a motor vehicle, in combination, a clutch, engaging and disengaging means for the clutch, controls for said means including means for regulating the rate of clutch engagement and a directly acting differential mechanism directly acting in the same direction as the clutch and responsive to any asynchronous speeds of the clutch members for controlling said regulating means.

17. In combination, in power transmission devices, a power input shaft, a power output shaft, a friction clutching device capable of rotationally connecting said shafts, means normally active to compel engagement of said clutching device, auxiliary power means for disengaging said clutching device, and re-engagement control means co-acting with said shafts and including mechanism directly acting between and responsive to speed differences existing between the said shafts.

18. In power transmissions, in combination, two shafts to be clutched together, clutching devices on each of said shafts, torsional synchronism responsive means directly stressed by elements rotating with each of said shafts, and clutch engagement control means connected to said first named means.

19. In power transmissions, in combination, a power shaft, a load shaft, a friction clutch connecting said shafts, a clutch control mechanism, and a synchronism responsive device concentric to said shafts, said device being directly operative in the same direction of rotation of said shafts to influence the action of said mechanism.

20. In power transmission controls, two shafts to be clutched together, a clutch adapted to couple said shafts, an element directly partaking of the rotational movement of one of the shafts, a second element directly partaking of the rotational movement of the other of said shafts, an intermediate element directly acted upon by both said first named elements, a clutch engagement control device for said clutch, and means connected to said device influenced by said intermediate element effective to control the rate of clutching together of said shafts.

21. In a power transmission and clutch assembly, in combination, a power shaft, a change speed transmission providing a plurality of driving speed ratios between an input and an output shaft, ratio selecting means for said transmission, a clutch associated with said transmission having elements connected to said power shaft and driving said transmission input shaft, operating means for said clutch, a device adapted to cause synchronous engagement of the driving speed ratios of said transmission made operative by selecting movement of said ratio selecting means, clutch engagement control mechanism coacting with the said operating means for said clutch and tending to cause engagement of said clutch elements at synchronous speeds of said power shaft and said input shaft, and control apparatus operatively associated with said ratio selecting means and said clutch operating means such that upon movement of said apparatus for change of transmission ratio the said means are made effective in sequence.

22. In power transmissions, in combination, a power shaft, a load shaft, a clutch intermediate said shafts, a speed ratio changing transmission likewise intermediate said shafts, a control for said transmission, synchronizing control means effective to regulate the rate of the engagement of said clutch, and synchronizing control means for the driving engagement of said gearing, both said means being arranged such that they are made consecutively and sequentially operative during speed ratio changing intervals established by said control for said transmission.

23. In power transmission control, in combination, two shafts, mutual clutch elements operatively connected to each of said shafts, means to compel engagement of said clutch elements, means to restrain said compelling action, a synchronizer device concentric to said shafts directly responsive to speed differences between the shafts, means associated with each of said shafts to influence the action of said device, and a connection between said device and said restraining means whereby said compelling means is made effective within synchronous speed ranges of said shafts.

24. In power transmission control, in combination, two shafts, mutual clutch elements operatively connected to each of said shafts, means to compel engagement of said clutch elements, means to restrain said compelling action, a synchronizer device associated with said shafts and constantly active to register speed differences between said shafts, means associated with each of said shafts to influence the action of said device, and a connection between said device and said restraining means whereby said compelling means is made effective within synchronous speed ranges of said shafts.

25. In power transmission control, in combination, two shafts, mutual clutch elements operatively connected to each of said shafts, preloaded means to compel engagement of said clutch elements, means to restrain said compelling action, a synchronizer device concentric to said shafts directly responsive to speed differences between the shafts, means associated with each of said shafts to influence the action of said device, and a connection between said device and said restraining means whereby said compelling means is made effective within synchronous speed ranges of said shafts.

26. A clutching mechanism comprising a friction clutch, spring tensioned synchronism control means associated with the driving and the driven elements of said clutch, and a connected permitting mechanism effective to control engagement of said clutch, a portion of said mechanism comprising a detent operative to lock a valve element of said mechanism in clutch engaging or disengaging position.

27. In power transmission mechanism, an engine having a suction space, a clutch, a variable speed transmission, ratio selecting means for said transmission, a servo device operative by suction derived from said suction space to disengage said clutch, a clutch disengaging control connected to said device, said first named control being actuated by ratio selecting movement of said means, and a clutch engaging control connected to said device, said last named control being inactive to variations in the degree of suction during the clutch engagement interval.

28. In power transmissions and power clutch control including a prime mover in combination, a clutch, a change speed transmission, a transmission control element, connections from said element for operating the clutch and always active upon movement of said element toward or from a speed selected position, and additional means for varying the speed of said prime mover and for operating said clutch, conjointly with change speed control movements of said control element.

29. In power transmissions, in combination, an engine and a clutch, lever controlled mechanism effective to provide coasting by disengagement of said clutch, a pedal commonly controlling the speed of said engine and the engagement of said clutch, a second pedal operative to engage or disengage said clutch and means whereby movement of either pedal is operative to compel engine braking through engagement of said clutch.

30. In automatic clutch controls, for automotive vehicles, in combination, a clutch, a fluid pressure device effective to disengage said clutch, a control mechanism for said fluid pressure device, a lever connected to said mechanism operative only to cause clutch disengagement, and additional means connected to said mechanism operative only to cause clutch engagement.

31. In power transmission controls, in combination an engine and a clutch, a pedal operative to control commonly the speed of said engine and the engagement of said clutch, a separate pedal effective during a portion of its movement to cause engagement of said clutch, and means whereby the rate of clutch engagement is synchronously controlled during operation of both pedals.

32. In an engine, transmission and clutch assembly, in combination, a clutch control mechanism, a ratio shifting lever, an engine throttle control interconnected with said mechanism, means responsive to movement of said lever toward or from a selected transmission driving position to effect clutch disengagement, and means coacting with said first named control whereby movement of said throttle control is thereafter effective to engage the clutch.

33. In an engine, variable speed transmission and clutch assembly, a control device adapted to select a plurality of variable speed ratios of said transmission, control mechanism for disengaging and engaging the said clutch assembly to provide a neutral dwell during the changes of speed ratio of said transmission by said control device, a control lever connected to said mechanism and to said device shiftable into and out of a plurality of speed ratio positions and adapted to cause said mechanism to declutch said clutch under predetermined normal positioning of said lever, and additional means effective upon the action of said control mechanism for completing the speed change driving interval initiated by the said lever in sequence, said additional means being coincidentally operative to control the speed of said engine.

34. In power transmission mechanism, in combination a change speed transmission, a clutch comprising driving and driven elements, means adapted to change the speed ratio of power transmission, mechanism connected to said first named means operative to establish a disengaged condition of said clutch, engagement-compelling means for said clutch, an auxiliary power device operative to overcome said compelling means, a separate manual control effective to establish clutch engagement at the will of the operator, and an auxiliary manual control whereby said clutch may be engaged or disengaged independently of said last named means and said device.

35. In power transmission controls, in combination, a power clutch coupling two shafts, a fluid pressure servo mechanism operative to disengage said clutch or to permit engagement, a control valve device for said mechanism, an actuating member for said device, a restraining means for said device, and flexible means joining said valve with said actuating member whereby mechanical energy is stored during activation of said restraining means.

36. In a vehicle driven by an internal combustion engine, a driving control apparatus comprising a clutch for said engine, a lever controlled servo-motor operative to disengage said clutch, and a control means associated with said apparatus whereby the clutch is prevented from engagement while any asynchronous speeds between the disengaged clutch members exist.

37. In automatic clutch devices for power transmissions, a pedal operative to control clutching, associated means for controlling declutching, and an independent control effective to control clutching and/or declutching regardless of the settings of either of said pedal or said means.

38. In combination, an engine, a clutch, a change speed transmission driven by said clutch and having a ratio changing means, auxiliary means to release the clutch, additional means effective during a part of the movement of said ratio changing means to render said auxiliary means operable to release the clutch, pedal operated means operative to restore said clutch to engagement and an additional pedal effective to overcome the action of said auxiliary means at any time.

39. In combination, an engine and speed control therefor, an auxiliary power operated clutch, and control means therefor, associated means for controlling said clutch by said engine speed control, a variable speed power transmission, a ratio selecting lever therefor, and means whereby the normal shift selection movement of said lever toward or from an operative position is effective to influence the action of said clutch said last named means including a lost motion connection.

40. In combination a prime mover, a speed control for said prime mover, a variable speed transmission, a clutch operative to connect said prime mover and said transmission, a control mechanism for said clutch, speed synchronization means for said clutch, speed synchronization means for said transmission, and selection means for said transmission effective to initiate cyclic, successive engagement of synchronized drive for both said clutch and said transmission.

41. In a synchronism control for clutch devices an input shaft, an output shaft, an element responsive to differential rotation action when the input shaft is rotating faster than the output shaft, and a second element responsive to differential rotation active when the input shaft is rotating slower than the output shaft, both said elements being inactive when synchronous speeds exist.

42. A driving member a driven member a clutch adapted to transmit drive between said members, an interposed mechanism comprising means responsive to differential rotation between said members, said means consisting of oppositely wound helical elements, a third element adapted to be actuated by either of said elements, said third element being effective to register synchronous and non-synchronous speed conditions of said members.

43. In a synchronization control for power couplings, in combination, a power shaft, a load shaft, a coupling adapted to transmit drive between said shafts, a control mechanism for said coupling, a device interposed operatively between portions of said shafts comprising a flexible means active when one of said shafts is rotating faster than the other, a second flexible means active when the other of said shafts is rotating faster than the first, and a member moved by either of said means effective to register the synchronous or asynchronous speeds of said shafts upon said control mechanism.

44. In power transmission devices, in combination, a friction clutch comprising driving and driven elements, a friction surface rotating at the speed of said driving element, a friction surface rotating at the speed of said driven element, an intermediate device contacting with and directionally responsive to differential rotation of said surfaces, and means acted upon by said device effective to regulate the rate of engagement of said friction clutch.

45. In automotive vehicles, in combination, an engine, a main clutch, main clutch driven shaft, an accelerator foot pedal, means responsive to the action of said pedal for initiating the engagement action of said clutch, and means controlled jointly by the speeds of said engine and said shaft operative to cause engagement of said clutch when said speeds are substantially synchronous.

46. In power control devices, in combination, a power shaft and a load shaft, a friction clutch adapted to couple said shafts, a change-speed gear driven by said load shaft, a ratio control member for said gear normally movable to and from gear drive establishing positions, biasing means tending to hold said clutch engaged, auxiliary power means arranged to overcome said biasing means and to disengage said clutch, control means for said power means biased for causing the power means to overcome said biasing means and to hold said clutch disengaged and movable to render said power means inactive such that said biasing means engages said clutch, and a connection between said ratio control member and said auxiliary power control means made operative by said normal movement of said member and effective to initiate either clutching or declutching of said clutch through the action of said connection upon said power control means.

47. In controls for power devices, in combination, a clutch embodying input and output elements, power means to operate said clutch, control mechanism for said means, a pedal arranged to operate said clutch by normal manual effort applied solely to rocking of said pedal between clutch engaged and disengaged positions, and auxiliary means interconnecting said pedal and said mechanism operative to render said power means ineffective upon a first movement of said pedal applied thereto as aforesaid.

48. In power devices, in combination, an engine, a throttle control for said engine, a load shaft, a source of subatmospheric pressure maintained by rotation of said engine, a servo motor adapted to be operated by said sub-atmospheric pressure, a clutch mechanism coupling said engine and said shaft and operable by said motor, piping connecting said source and said servo motor, valving located in said piping intermediate said source and said servo motor effective to render the servo motor effective and ineffective to operate said mechanism, control means for said valving operated by and with said engine throttle control in accordance with increase and decrease of engine speed determined by said throttle control, said control means including a lost-motion connection, and auxiliary control means connected to said valving control means through said lost-motion connection such that said valving may be moved to render said servo motor effective to shift said mechanism to declutched position at the will of the operator.

49. In power devices, in combination, an engageable and disengageable coupling, a control for said coupling, a driving element and a driven element joined by said coupling, an intermediate element interposed between and subject to relative speeds of rotation of said elements, said intermediate element assuming a plurality of positions in accordance with the differential of speeds of said driving and driven elements, and a device connected to and operated by said intermediate element and connected to said control, effective to regulate the driving engagement of said coupling in accordance with said differential of speeds of said driving and driven elements.

50. In power control mechanism, in combination, a clutch device having input and output shafts, an interposed mechanism directly responsive to speed differences in the same direction of rotation of said shafts, means to engage and disengage said clutch, and interconnected means operative between said means and said mechanism to control the rate of engagement of said clutch device.

51. In power devices, in combination, an input power member, an output power member, a coupling joining said members, an interposed element having a friction face in contact with a corresponding face of the input power member, and a second face in contact with a corresponding face of the output power member, and mechanism responsive to movement of said element operative to control the engagement of said coupling.

52. In power control devices, in combination, an engine throttle control, a friction clutch, a variable speed gearing driven by said clutch, biasing means tending to hold said clutch engaged, auxiliary power means effective to overcome said biasing means, control means for said power means manipulable by said throttle control and normally effective to cause said power means to become active such that the said biasing means is ineffective to hold said clutch engaged, and effective when said throttle control is moved to increase throttle setting to render the power means inactive and the biasing means effective, a gear ratio control member for said gearing normally movable to and from gear drive establishing positions, and manually operable auxiliary mechanism moved solely by such normal movement of said gear ratio control member effective to operate said auxiliary power control means such that initiation of either clutching or declutching action by said clutch is obtained.

DANIEL C. WILKERSON